United States Patent [19]
Hartmann

[11] Patent Number: 4,772,199
[45] Date of Patent: Sep. 20, 1988

[54] INSTALLATIONS FOR DRYING AND BAKING CERAMIC PRODUCTS

[75] Inventor: Michel Hartmann, Hericourt, France

[73] Assignee: Societe D'Estudes et de Constructions Electroniques, France

[21] Appl. No.: 884,544

[22] Filed: Jul. 11, 1986

[30] Foreign Application Priority Data

Jul. 12, 1985 [FR] France ................. 85 10712

[51] Int. Cl.⁴ ............................................. F27B 9/00
[52] U.S. Cl. ..................................... 432/133; 432/144; 432/241
[58] Field of Search ............... 432/133, 136, 141–144, 432/258, 241

[56] References Cited

U.S. PATENT DOCUMENTS

| | | | |
|---|---|---|---|
| 3,172,647 | 3/1965 | Remmey | 432/133 |
| 3,834,865 | 9/1974 | Lee | 432/241 |
| 3,841,614 | 10/1974 | Okuno | 432/133 |
| 4,005,979 | 2/1977 | Brock | 432/144 |
| 4,030,879 | 6/1977 | Stanasila et al. | 432/144 |
| 4,249,895 | 2/1981 | Mantegani | 432/133 |
| 4,487,579 | 12/1984 | Irwin | 432/241 |
| 4,504,221 | 3/1985 | Hartmann | 432/241 |
| 4,616,995 | 10/1986 | Lingl, Jr. | 432/144 |

Primary Examiner—Henry C. Yuen
Attorney, Agent, or Firm—Darby & Darby

[57] ABSTRACT

Drying and baking installation in which the products pass through the drying oven (S) and the baking oven (C) on the same carriages (1) by means of a single, continuous path, without intermediate handling; the products are stacked without contact with one another by means of superposed ceramic supports; the outlet from the drying oven is connected to the entrance to the baking oven by an air-tight enclosure, the system thus forming a continuous and tight enclosure and the pressure of the gases as the products enter the baking oven is at least equal to the pressure of the gases as the products leave the drying furnace.

4 Claims, 2 Drawing Sheets

INSTALLATIONS FOR DRYING AND BAKING CERAMIC PRODUCTS

The manufacture of ceramic products such as tiles, bricks or others is generally done by molding and pressing clay, this operation giving rise to malleable, and deformable raw or green products which undergo a drying operation under conditions of handling, and on supports designed to prevent deformation. After this drying, the products which have become relatively rigid are sent to the baking operation under conditions of handling and supports designed to permit a dense stacking.

In this technology, the dryers are designed to use considerable masses of air enveloping relatively dispersed products, which allows a high flow of air per kg of water evacuated, with a low extraction temperature (about 35° C.), while the baking ovens are designed to operate on products tightly packed on collective supports, with minimal air flows but strict sealing conditions to improve the heat balance; the difference in structure and operating conditions require different supports for the drying and the baking: individual supports in the drying, designed to prevent deformations but having to withstand just low temperatures, hence made of inexpensive material (wood, plastic); and collective supports of the dry products for maximum use of the space in the oven, these supports having to be made of materials resistant to high temperatures and withstanding load descents at the baking temperature, which makes them expensive. A transfer handling from one type of support to the other, from one means of stacking to the other, is therefore necessary between drying oven and baking oven.

The object of the invention, is an installation that will avoid these drawbacks, increase the productivity of the system and reduce the consumption of energy.

The installation according to the invention is of the continuous tunnel furnace type in which carriages loaded with products for drying and baking move in countercurrent to a circulation of drying and/or baking air, the said carriages travelling in a pit filled with water and fitted at their base with a peripheral skirt that is constantly immersed in the water over their entire perimeter; it is characterized by the fact that the drying oven and baking oven are separated from one another by an intermediate zone, also tight, the pressure of the gases where the products enter the baking oven (which is also the pressure at the end of the said intermediate zone I) is at least equal to the air pressure where the products leave the drying oven (which is also the pressure at the start of the said intermediate zone), the two ovens being fitted with doors and the system of drying oven, intermediate zone, and baking furnace comprises at its base, a continuous pit filled with water in which the peripheral skirts of the carriages are immersed; so that this system will be perfectly tight; the drying oven being fitted with partial or total recycling means and means for reheating the recycled air.

The invention also envisages the following arrangements:

The product are stacked without contact between one another on the carriages by means of superposed ceramic supports (or gazettes, these ceramic supports having, on the one hand, wedging elements to prevent deformation, a sole perforated for passage of air and superposable side walls allowing descents of load in stacking and withstanding crushing.

The length of the intermediate chamber is on the order of the length of one carriage.

The carriages move forward step by step in the drying oven-baking oven system, the step being equal to or a whole multiple of the length of a carriage, the stacks of gazettes are equidistant, with a gap that is equal to, or a sub-multiple of, the length of a carriage, and the means of recycling air with reheating are distributed so that induction and discharge, at each stopping point, are both situated in line with a space separating two stacks of gazettes, the length of this space being a few decimeters.

The means of partial or total recycling and heating comprise an induction channel placed transversely to the oven, open at the bottom, connected to a blower whose discharge duct includes a heating means such as a burner, and opens into a ramp parallel to the induction channel, this ramp being fitted with acceleration nozzles.

A double door in the form of a lock is provided at the outlet from the baking oven, the distance between the two doors of the lock being greater than the length of a carriage.

The drying air is insufflated in reflux at the entrance to the intermediate zone (which is also the outlet from the drying oven) and evacuated by a chimney situated at the entrance of the said drying oven; while the baking air is insufflated at the outlet from the baking furnace and evacuated—at least partially—through a chimney situated at the outlet from the intermediate zone which is also the entrance to the baking oven.

The advantages inherent in the invention will be explained below following the description of an example of embodiment illustrated by the attached drawing in which.

Figure 1:
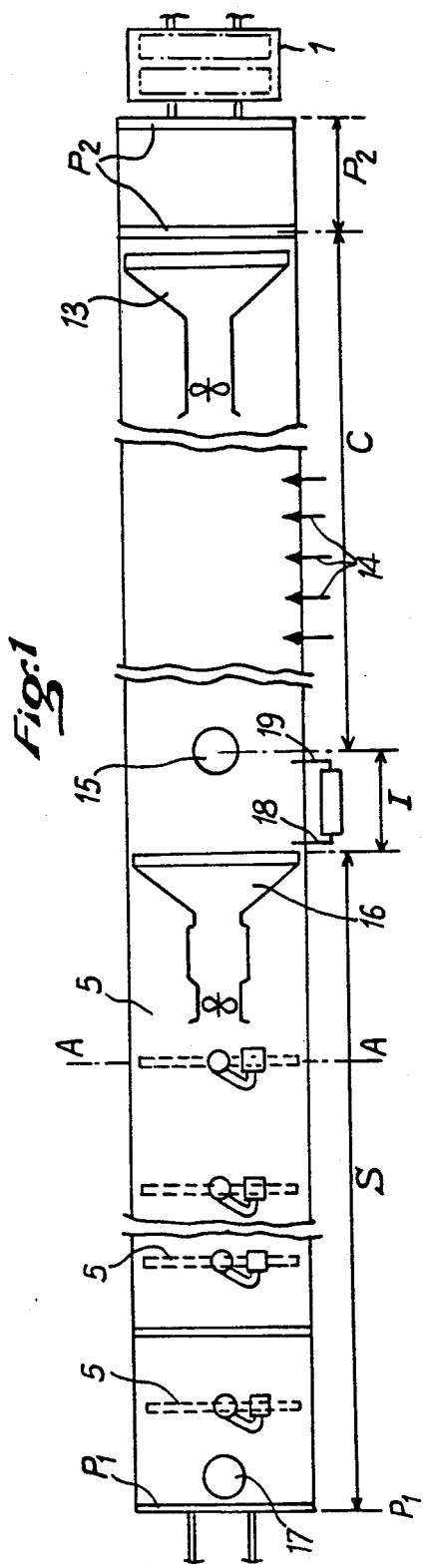
FIG. 1 is a diagrammatic view in plan of a drying oven-baking oven system according to the invention.
Figure 3:
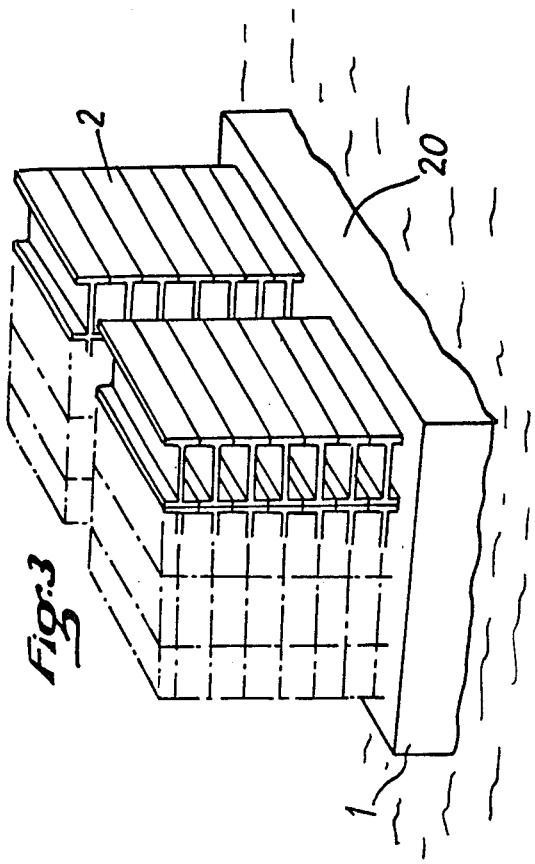
FIG. 3 is a diagrammatic perspective illustrating the stacking of the products on carriages.

Referring to these figures it becomes obvious that in the example of embodiment represented, the drying oven S and the baking oven C are rectilinear and in the extension of one another. This arrangement is in no way limiting, but is preferred for the structural advantages that it entrains.

The drying oven S has a door P1 that is opened every time a carriage enters and then recloses. Baking oven C has an outlet door P2 (a lock with two doors in this case to perfect the seal and reduces heat losses). But preferably, there is no door at the outlet from the drying oven (entrance to the intermediate zone I) nor at the entrance to the baking oven (exit from intermediate zone I) and the space inside the system is preferably continuous.

Inside this system the products travel on carriages 1, on which they are disposed in stocks 2 by means of ceramic gazettes and the carriages are advanced step by step, the step being equal to or a sub-multiple of the gap between carriages.

The gazettes incorporate a perforated sole 3 supporting the products, possible wedging projections (not shown) to prevent their deformation, and vertical side flanks 4 for stacking the products without contact with one another and the vertical transmission of loads by the flanks 4.

Thus the products pass continuously through the drying oven and the baking oven without intermediate handling, and their stacking is embodied so as to meet both the conditions proper to supports of raw or green products (no contact between products, means proper to avoiding deformation) and the conditions proper to supports of dried products ready for baking (resistance to temperatures, stacking density, descents of loads in stacking, air circulation). For the implementation of this new technology, the invention provides that the drying oven and baking oven be very tightly sealed, and that the means of this sealing be the same in the two ovens so that the system may form a continuous enclosure, and so that the pressures in each zone may be strictly controlled.

With this in mind it is preferable to use the sealing means described in French Pat. No. 82,022,294, filed Feb. 12, 1982, published under No. 2,521,704 in the name of Entreprise Hartmann Pere et Fils, the bottom pits of the drying oven S and of the baking furnace C being connected by a bottom pit provided in the intermediate enclosure I, so as to form a continuous bottom pit 22 over the entire length of the system, the skirts 20 of the carriages thus remain continually immersed in the liquid mass 21 of this pit which insures a hydraulic seal.

Nevertheless, such an arrangement means that the products pass through the drying oven in the form of high-density stacks, with the consequent risk of condensation and trickling which could lead to deformations or alterations of the raw products.

This is why the invention provides a reconditioning of the drying air, produced by units 5 distributed along the oven S which reheat the air and reinject it into the oven.

The stacks are preferably disposed on the carriages so as to equidistant and separated by an interval of a few decimeters, for example 0.30 to 0.50 m, the interval between two adjacent stacks on two carriages in contact being identical to the interval between two stacks on the same carriage (it is also possible to provide single-stack carriages). And the units 5 are situated at emplacements coinciding with the position of the spaces between stacks at the stops of the step-by-step advance of the carriages.

Figure 4:
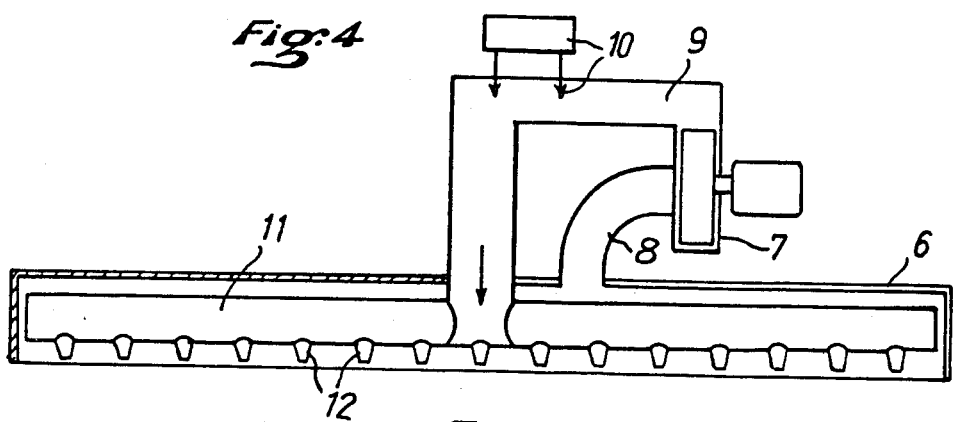
FIG. 4 is a view in vertical section AA of FIG. 1.
Figure 5:
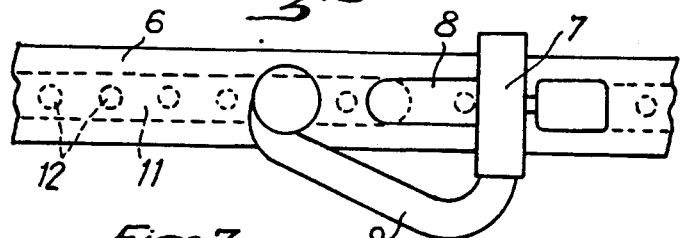
FIG. 5 is a partial view from above of the air-reconditioning system in FIG. 4.
Figure 7:
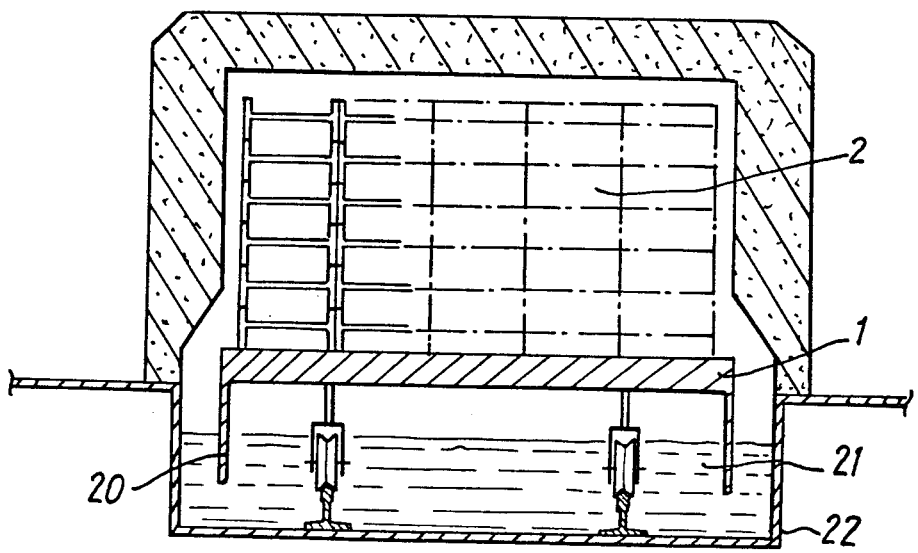
FIG. 7 is a diagrammatic section of the drying oven along AA in FIG. 1.

An example of embodiment of a unit 5 is represented in FIGS. 4 and 5, it is formed of a channel 6 crosswise to the oven, open at the bottom, in the form of an inverted trough or flume constituting the induction opening; channel 6 is connected to blower 7 by duct 8; the air induced by blower 7 is discharged through pipe 9, containing relating means 10 toward a ramp 11 fitted with nozzles 12 to accelerate the air.

In the example represented, ramp 11 is coaxial to channel 6, but it can also be parallel and contiguous, or parallel to and distant from channel 6 by an interval close to the gap between stacks 2.

Baking oven C is equipped in known fashion with means for introduction of air under pressure 13, means for injection of fuel 14 and a chimney to draw off products of combustion 15. The drying oven S, in turn, has means for introduction of hot air under pressure 16, and, in addition to the units 5 described above, an evacuation chimney 17.

According to the invention, the intermediate enclosure I is equipped with pressure sensors 18, 19, controlling the air pressure at the ends of this enclosure (at the outlet from oven S and at the entrance to oven C) and means, preferably automatic, are provided to regulate these pressures. The action will be, for example, on the opening of chimney 15 and on the blower applying pressure to the introduction of air 16. The pressures at 18 and 19 are regulated so that the pressure at 19 will be equal to or higher than the pressure at 18. When the pressures at 18 and 19 are equal, there is no airflow between ovens C and S and enclosure I is a dead zone where air circulation is converned. The products of combustion from oven C do not enter oven S and vice-versa, in spite of the absence of doors and the continuity of space between the ovens.

This arrangement is very important, especially when the products of combustion contain soluble salts resulting from the baking, and which should not be allowed to settle on the products during the drying, in order to avoid the phenomena of efflorescence.

But when this danger is absent, the invention permits the use of a predetermined part of the heat of the products of combustion coming from the baking zone, for the drying, by adjusting the pressure at 19 to a level above the pressure at 18, which leads to a considerable economy of energy.

In any event, the pressure at 19 should remain higher than the pressure at 18.

The invention constitutes a veritable technological transformation whose advantages are considerable, in spite of the higher investments and expenses due to the use of individual ceramic gazettes, or at least ones that avoid contact of the products with one another. As a matter of fact, the ceramic supports are expensive, fragile and short-lived. It was therefore normal to use materials of low value such as wood or plastic for the supports in the drying, while in the baking the supports, necessarily of ceramic, were designed to assemble a group or package of dry products, hence sufficiently rigid to be stacked or placed against one another, in order to minimize the expense incurred for the supports.

Against these data, the installation according to the invention multiplies the ceramic supports (a factor of multiplication of 10 to 15) and consequently raises the costs of support renewal installation and handling (since the handling concerns a much larger number of fragile supports).

But, in conventional drying and baking units, the length of the drying cycle is on the order of 24 hours, and that of the baking cycle is on the order of 48 hours.

These times, where drying is concerned, result from the use of large flows of air at low extraction temperature (about 35° C.); and where the baking oven is concerned these times result from the use of collective supports of dry products, containing, for example 80 kg of products in a space of 130 dm$^3$, a mode of stacking with high thermal inertia, since the tight packing of the products close to one another inhibits the circulation of air.

The combination of the invention in which the baking supports have the characteristics of drying supports while the stacking has the characteristics of a stacking of baking supports permits both the elimination of handling between drying oven and baking oven and the reduction of the lengths of the cycle times to levels that can reach 6 hours for the drying and 9 hours for the baking.

This enormous reduction of the cycles is due to the fact that the flow of air in the drying is much lower, but compensated by a systematic reheating along the dryer, the temperature of the extracted air being higher (60° C.) and, for the baking, the thermal inertia of the mode of stacking is much lower, since the volume of a gazette can be on the order of 7 dm$^3$ for a weight of 6 kg; and the use of ovens with very tight sealing makes it possible to master, and to very substantially raise the pressures and reduce the quantity of air necessary for the products.

Thus, in a conventional baking oven the pressure is on the order of 2.5 mm of water and the consumption of air is on the order of 3 to 4 tons per ton of products treated, while the installation according to the invention can function at a pressure of 100 mm of water and consume 1.5 tons of air per ton of product.

The higher productivity figures and the energy economies thus obtained largely compensate for the supplementary costs occasioned by the stockage and consumption of ceramic supports.

Another advantage of the invention is the considerable reduction in pollution resulting from the reduction in airflows used.

And finally, the invention permits embodiments that were difficult heretofore, in particular the baking of enameled products, and a more rational flashing.

As a matter of fact, for the baking of enameled products it is very important to avoid contacts between products which give rise to defects in enameling.

Since the drying and the baking are embodied here without intermediate handling and by means of a stacking on supports avoiding any contact between the products, it becomes possible without any additional steps, except for a coating of enamel after molding the products, to manufacture enameled products with no risk of alteration of the enamel.

Likewise, since the products are separated, it becomes possible, without a special arrangement, to obtain flashing effects which are much more satisfactory.

The invention is open to variations and to adaptation as a function of the form and the nature of the products to be dried and baked. The respective lengths of the ovens, the lengths of the cycles, the use of the products of combustion in the drying, the number of stacks per carriage, the number of products per gazette and the form of the latter can vary in each case.

Figure 2:
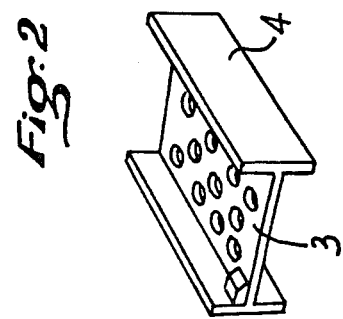
FIG. 2 is a diagrammatic perspective of a support gazette.
Figure 6:
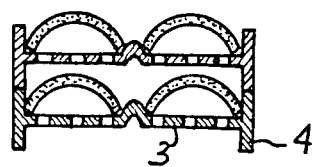
FIG. 6 illustrates a gazette with products.

The gazettes in FIG. 2 can be designed as individual supports, for example in the case of molded tiles, but the gazettes can just as well be designed to hold a plurality of products as represented in FIG. 6. The essential characteristic remains that these products be disposed without contact between one another, suitably wedged and supported on a perforated sole 3, and that the lateral flanks 4 allow stacking by superposition of the gazettes, the descent of loads and mechanical crushing strength.

I claim:

1. A drying and baking installation for ceramic products of the continuous tunnel furnace type in which carriages, loaded with products to be dried and baked move in counter-current to a circulation of drying and-/or baking air, the said carriages moving in a pit filled with water and being equipped at their base with a peripheral skirt constantly immersed in the water over its entire perimeter, said installation comprising:

a drying oven and a baking oven separated from one another by an intermediate zone, and each being tightly sealed, the pressure of the gases as the products enter the baking oven being the same as pressure at the end of said intermediate zone, and at least equal to the air pressure where the products leave the drying oven, which pressure is equal to the pressure at the beginning of said intermediate zone;

said drying oven being fitted with a first door, and said baking oven being fitted with a second door;

the system of said drying oven, said intermediate enclosure and said baking oven each comprising at the bottom a continuous pit filled with water, in which the peripheral skirts of the carriage are immersed, so that this system will be strictly tightly sealed;

said drying oven being fitted with means for partial or total recycling and for heating of the recycled air;

said baking oven being operable at substantially higher air pressure than said drying oven and intermediate zone;

means for stacking said products without contact with one another on the carriages by means of superposed ceramic supports or gazettes, said ceramic supports incorporating wedging elements to prevent deformation, a sole with perforations for passage of air, and superposable side walls insuring descents of load on stacking, and providing crushing strength;

said means for air recycling including an induction channel crosswise to said drying oven and open at the bottom, connected to a blower means having a discharge duct containing a heater, an opening into a ramp parallel to the induction channel, said ramp being fitted with a plurality of acceleration nozzles for increasing the speed;

said drying air being insufflated in reflux at the entrance to the intermediate zone, said entrance also serving as an outlet from said baking oven, and evacuated by a second chimney situated at the entrance to said drying oven; and said baking air being insufflated at an outlet from the baking oven and evacuated by said first chimney situated at an outlet from the intermediate zone which is also the entrance to said baking oven.

2. The installation according to claim 1, wherein the length of the intermediate enclosure is on the order of the length of one carriage.

3. The installation according to claim 1, further including means for advancing the carriages in the system of said drying oven and said baking oven in a step by step advance, each step being equal to, or a whole sub-multiple of, the length of one carriage, the stacks of gazettes being equidistant, with a gap equal to, or a sub-multiple of, the length of one carriage and the means for air recycling with heating being distributed so that the induction and discharge are each located, at each stop, in line with a space separating two stacks of gazettes, the length of the said space being a few decimeters.

4. The installation according to claim 1, wherein said baking furnace includes an outlet with a double door in the form of a lock, the distance between the two doors in the lock being greater than the length of one carriage.

* * * * *

UNITED STATES PATENT AND TRADEMARK OFFICE
CERTIFICATE OF CORRECTION

PATENT NO. : 4,772,199
DATED : September 20, 1988
INVENTOR(S) : Michel Hartmann

It is certified that error appears in the above-identified patent and that said Letters Patent is hereby corrected as shown below:

ON THE TITLE PAGE:
The assignee's name should read as follows:

-- Societe d'Etudes et de Constructions Electriques et Mecaniques SECEM --

Signed and Sealed this

Nineteenth Day of December, 1989

Attest:

JEFFREY M. SAMUELS

Attesting Officer     Acting Commissioner of Patents and Trademarks